(12) United States Patent
Hively et al.

(10) Patent No.: US 7,783,450 B2
(45) Date of Patent: Aug. 24, 2010

(54) METHOD AND SYSTEM FOR REDUCING ERRORS IN VEHICLE WEIGHING SYSTEMS

(75) Inventors: Lee M. Hively, Philadelphia, TN (US); Robert K. Abercrombie, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 164 days.

(21) Appl. No.: 12/072,309

(22) Filed: Feb. 26, 2008

(65) Prior Publication Data

US 2009/0125273 A1 May 14, 2009

Related U.S. Application Data

(60) Provisional application No. 61/003,095, filed on Nov. 14, 2007.

(51) Int. Cl.
*G01G 19/03* (2006.01)
(52) U.S. Cl. .................. 702/175; 702/174; 702/173; 702/101; 177/136; 177/132; 177/133; 177/134
(58) Field of Classification Search .................. 702/101, 702/173, 174, 175; 177/132, 133, 134, 136
See application file for complete search history.

(56) References Cited

U.S. PATENT DOCUMENTS

| 5,815,413 | A | | 9/1998 | Hively et al. |
| 5,959,259 | A | | 9/1999 | Beshears et al. |
| 5,998,741 | A | | 12/1999 | Beshears et al. |
| 6,034,334 | A | * | 3/2000 | Nakamura et al. ........ 177/25.18 |
| 6,459,050 | B1 | * | 10/2002 | Muhs et al. .................. 177/133 |
| 6,801,866 | B1 | * | 10/2004 | Yarian .......................... 702/101 |
| 7,305,324 | B2 | | 12/2007 | Beshears et al. |
| 2006/0111868 | A1 | | 5/2006 | Beshears et al. |
| 2007/0067141 | A1 | | 3/2007 | Beshears et al. |

\* cited by examiner

*Primary Examiner*—Sujoy K Kundu
*Assistant Examiner*—Hyun Park
(74) *Attorney, Agent, or Firm*—Boyle Fredrickson, S.C.

(57) ABSTRACT

A method and system (10, 23) for determining vehicle weight to a precision of <0.1%, uses a plurality of weight sensing elements (23), a computer (10) for reading in weighing data for a vehicle (25) and produces a dataset representing the total weight of a vehicle via programming (40-53) that is executable by the computer (10) for (a) providing a plurality of mode parameters that characterize each oscillatory mode in the data due to movement of the vehicle during weighing, (b) by determining the oscillatory mode at which there is a minimum error in the weighing data; (c) processing the weighing data to remove that dynamical oscillation from the weighing data; and (d) repeating steps (a)-(c) until the error in the set of weighing data is <0.1% in the vehicle weight.

24 Claims, 7 Drawing Sheets

METHOD AND SYSTEM FOR REDUCING ERRORS IN VEHICLE WEIGHING SYSTEMS

CROSS-REFERENCE TO RELATED APPLICATIONS

The benefit of priority based on U.S. Prov. App. No. 61/003,095 filed Nov. 14, 2007, is claimed herein.

STATEMENT REGARDING FEDERALLY SPONSORED RESEARCH

This invention was made with U.S. Government support under Contract No. DE-AC05-00OR22725 awarded to UT-Battelle LLC, by the U.S. Dept. of Energy. The Government has certain rights in the invention.

TECHNICAL FIELD

The field of the invention is systems and methods for weighing vehicles, for transport on aircraft and for highway inspections, border security, check points, port entries and for other instances where accurate weights of vehicle and their cargo are needed.

BACKGROUND ART

Beshears et al., U.S. Pat. Pub. No. US2006/0111868, assigned to the party of interest herein, discloses a system that automatically obtains the following data from a vehicle that is driven slowly ($\leq 5$ MPH) over multiple weigh-pads on smooth asphalt or concrete surfaces: weight on each tire; single-axle weights; total vehicle weight; axle spacings; longitudinal and transverse centers of balance; and wheel spacing on each axle.

Abercrombie et al., U.S. patent application Ser. No. 11/583,473, also assigned to the party of interest herein, describes the operation of the system to determine vehicle length, width, and height, and an estimate of the vehicle volume from two-dimensional digital images.

Walker et al., U.S. patent application Ser. No. 11/703,992, also assigned to the party of interest herein, describes use of the system for vehicle identification via radio-frequency ID tag or barcode and for vehicle inspection and cargo characterization.

Alternative methods use static measurement of vehicle weight, a tape measure for determining axle distances, manual recording of individual axle weights and distances, manual calculation of total vehicle weight and center of balance, and manual entry of the results into a computer system.

U.S. Federal and State agencies need certifiable vehicle weights for various applications, such as highway inspections, border security, check points, and port entries.

Before implementing the present invention, the error in total weight for a vehicle was greater than the error in weighing on in-ground scales (IGS) and greater than 0.1%. The weigh-in-motion system of the prior art was not capable of providing certifiable weights, due to natural oscillations, such as vehicle bouncing and rocking and other vehicle dynamics during weighing activities.

SUMMARY OF THE INVENTION

The present invention involves a method and system for vehicle weighing to remove the effects of oscillatory modes due to motion of the vehicle during weighing. It has been discovered that reduction in weighing errors can be made to enable certifiable weight measurements (error $\leq 0.1\%$) for a higher traffic volume with less effort (elimination of redundant weighing).

The method of the present invention involves weighing a vehicle on a plurality of weight-sensing elements and determining vehicle weight with an error of no greater than 0.1%. The method comprises: receiving at least one set of weighing data for a vehicle that has passed over the weight-sensing elements; processing the weighing data to provide a plurality of mode parameters representing oscillatory modes in the data; analyzing the plurality of mode parameters to determine a minimum of error in the weighing data; and removing these dynamical oscillations from the weight data to reduce the error in the weighing data to 0.1% or less.

The system of the invention is provided by computer programming that runs on a computer for receiving the weighing data from the weight-sensing elements, the programming having a portion applied to the weight-sensing data to determine the mode parameters representing oscillatory modes in the data due to movement of the vehicle during weighing; a portion applied for analyzing the plurality of mode parameters to reduce the error in the weighing data; and a portion applied for processing the weighing data to remove the dynamical oscillations; and a portion for recomputing the error in the sets of weighing data until the error is 0.1% or less in the vehicle weight.

The system described herein can be part of a larger vehicle inspection station of the type described in Walker et al., U.S. patent application Ser. No. 11/703,992, cited above. And, the weight sensing elements can be part of a general weighing platform for determining weight.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION

Figure 1:
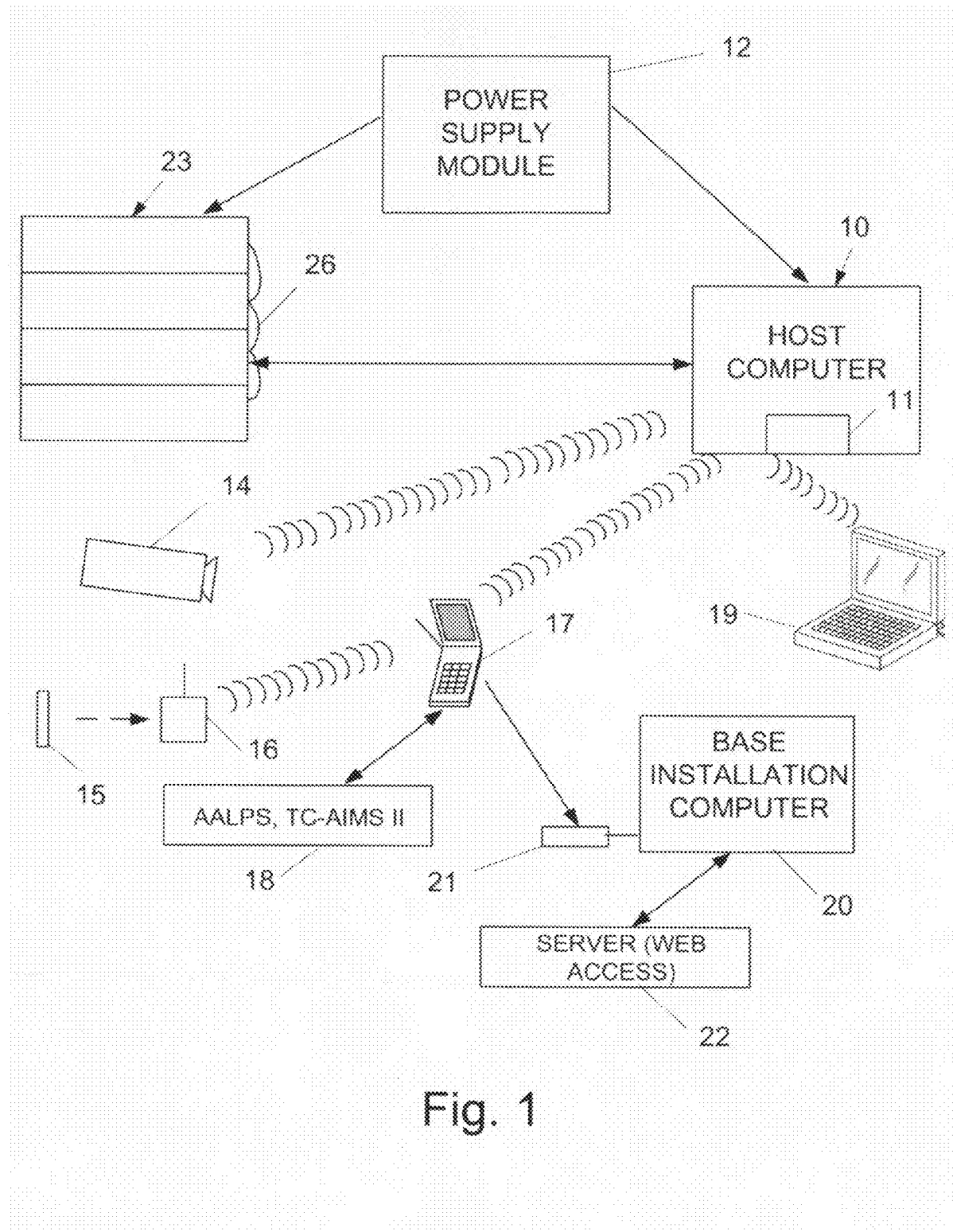
FIG. 1 is a block diagram of the system for practicing the method of the present invention.

Referring to FIG. 1, the system of the present invention utilizes a host computer 10 with a network interface 11 according to IEEE Std. 802.11 and a power supply module 12. This network interface 11 can support wireless communication. The host computer 10 and power supply module 11 are connected by cabling to vehicle track elements 23 also referred to herein as weight sensing pads, which are seen in more detail in FIG. 2. The vehicle inspection system also includes a digital camera 14 for imaging a vehicle (FIG. 2) because the system determines both the weight and the volume of the vehicle 25. The vehicle inspection system also includes a bar code reader 16 for reading an identification tag or label 15 on the vehicle. This bar code reader 16 can transmit data wirelessly back to a handheld unit 17, which can further transmit data wirelessly back to the host computer 10. The handheld unit 17 can also be networked to AALPS or TC-AIMS II systems which are described in Beshears et al., U.S. Pat. Pub. No. US2006/0111868, cited above. The handheld unit 17 also has a universal adapter that allows two-way exchange of information necessary to operate at the system and allows weighing and inspecting vehicles in an ad-hoc manner. The handheld unit 17 can download data through a cradle 21 to a base installation computer 20 which is connected to a server for Internet access. The host computer 10 is further networked to a laptop computer 19, which is convenient for an operator of the system for viewing operation of the system. The laptop computer 19 can also perform the same functions as the handheld unit 17.

Figure 2:
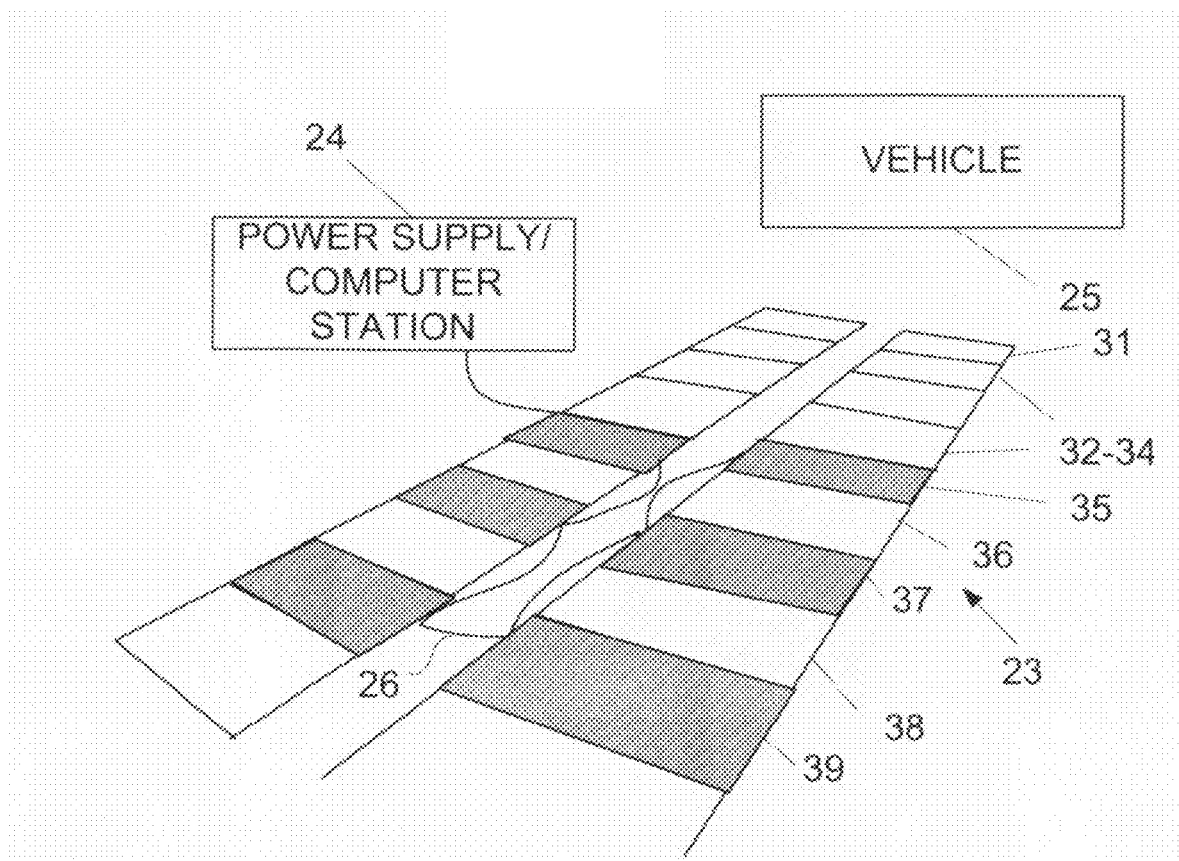
FIG. 2 is a schematic perspective view of a portion of the system of FIG. 1.

Referring to FIG. 2, the power supply 12 and the host computer 10 and laptop 19 form a computer station 24 which is connected to two sets of track elements 23 by cabling 26. Each set of track elements 23 includes a ramp 31, three advance or spacer leveling pads 32-34, up to four pairs (eight) weight sensing pads (in illustration three pairs [six individual weight sensing pads] are shown) 35, 37 and 39 alternated with additional spacer pads 36 and 38. The weight sensing pads 35, 37 and 39 include electronics for generating weight data to the computer station 24 and are connected by the cabling 26 to the computer station 24 as described further in the prior art cited above. These tracks are further shown and described in Beshears et al., U.S. Pat. Pub. No. US2006/0111868, cited above.

Figure 3:
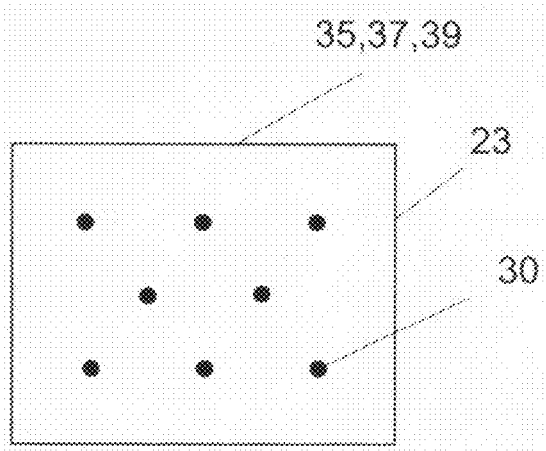
FIG. 3 is a detail plan view of one weighing segment of a track seen in FIG. 3.

To summarize this here for convenience of the reader, and referring to FIG. 3, which represents each weight sensing pad 35, 37, 39 as having eight load cells 30 and its own microcomputer (not shown) for processing signals that are converted to digital form and summed to provide weight data, and further processed to provide speed data and time that a wheel of a vehicle crossed the weight sensing pads 23. The direction of travel over the collective individual pads 23 is indicated by the arrow in FIG. 3. This data is then sent to the host computer 10. This data is referred to as time-serial weight data since it represents a plurality of samples at discrete times at equally spaced time intervals, $\Delta t$.

Weight-measurement error arises from oscillations as a vehicle 25 traverses the weighing system. These dynamics occur, because a vehicle is (i) a multi-body system of discrete masses (e.g., body, load, wheels) that are (ii) interconnected by springs (e.g., cab-load coupling, wheel suspensions) and are (iii) excited by various aperiodic forces (e.g., uneven terrain, steering changes, acceleration, wind variability, load shifts in liquids, engine vibration) with (iv) nonlinear damping by slip-stick friction and shock absorbers. Lower-frequency oscillations (1-5 Hz) arise from vehicle dynamics (e.g., side-to-side rocking, front-to-back rocking, vertical bouncing of the load on the suspension, load-bed flexure, twisting about coupling points, and nonlinear couplings among these modes). Higher-frequency oscillations (9-14 Hz) depend on vehicle size (e.g., tire rotation). Accurate weights require minimization of these oscillations, which weight measurements presently reduce via a combination of: (a) minimal excitations by a smooth, flat, level approach, weighing, and exit; (b) constant, slow speed driving in a straight line; (c) several single-axle weight measurements as the vehicle crosses multiple weigh pads; and (d) continuous motion to foster dynamic friction, which reduces the slip-stick (static) friction. Further reduction of weight measurement error requires analysis of the time-serial weight data for removal of these vehicle oscillations.

A model for the vehicle oscillations, x(t), over time, t, uses a second-order, ordinary differential equation:

$$m\frac{d^2 x}{dt^2} + \gamma \frac{dx}{dt} + kx = F(t). \qquad \text{Eq. 1)}$$

The variable m is the vehicle mass; $\gamma$ is the damping coefficient; k is the spring constant for the vehicle suspension; and the forcing function is:

$$F(t)=A\cos(\omega t). \qquad \text{Eq. 2)}$$

The solution is:

$$x(t)=(A/G)\sin(\omega t-\delta), \text{ where } \delta=A\cos(\gamma\omega/G). \qquad \text{Eq. 3)}$$

The resonance term is:

$$G=\sqrt{m^2(\omega^2-\Omega^2)+\gamma^2\omega^2} \text{ with } \Omega=\sqrt{(k/m)}. \qquad \text{Eq. 4)}$$

Real-world forces usually have multi-modal forcing functions of the form, $$F=\Sigma_j F_j \cos(\omega_j t+\phi_j). \qquad \text{Eq. 5)}$$

Each mode has a different amplitude ($F_j$), frequency ($\omega_j$), and phase ($\phi_j$). Here, $\Sigma_j$ indicates summation over the various forcing modes. The net response to such multi-modal driving functions is the sum of the periodic solutions with a relative phase shift:

$$x(t)=\Sigma_j(A_j/G_j)\sin(\omega_j t-\delta_j+\phi_j). \qquad \text{Eq. 6)}$$

If the forcing-function parameter values are available, then this approach can determine the mass from the vehicle oscillations. However, the forcing-function parameters are not known, and cannot be inferred from the time-serial weight data. Also, the arbitrary phase ($\phi_j$) obscures the deterministic phase ($\delta_j$) that can be used with the resonance factor (G) to determine the mass.

If the vehicle oscillations are removed from the weight data, the weight measurement error will be reduced. The time-serial weight measurement, W(t), can be expressed in the form:

$$W(t)=w+\Sigma_j A_j \sin(\omega_j t+\phi_j)e^{\alpha_j t}. \qquad \text{Eq. 7)}$$

Here, w is the filtered vehicle weight that the weighing system seeks to measure. The j-th sinusoidal mode is characterized by an amplitude ($A_j$), frequency ($\omega_j$), and phase ($\phi_j$). The summation, $\Sigma_j$, is over all of the oscillatory modes. The test data have both exponential growth ($\alpha_j>0$) and decay ($\alpha_j<0$) of sinusoidal modes, which is modeled by the term, $e^{\alpha_j t}$. Re-arrangement of Eq. (7) extracts the filtered weight:

$$w(t)=W(t)-\Sigma_j A_j \sin(\omega_j t+\phi_j)e^{\alpha_j t}. \qquad \text{Eq. 8)}$$

The left-hand side of Eq. 8) shows an explicit time dependence in the filtered weight, w(t), because the results show that the filtered weight has residual time-variability, even after removal of many oscillatory modes. These dynamic modes are like harmonics except that they are not purely sinusoidal waveforms, but also exhibit exponential decay and exponential increase. Experimental data from recent weight tests were obtained at a sampling rate of 1,000 Hz ($\Delta t=0.001$ second) as vehicles traversed the two-foot-long weigh pads. Minimal transients in the weight data occur in the central (one foot) section of the weigh pad, corresponding to a "flat-top" interval that was used for the weight-determination analysis. The flat-top region was traversed in <200 milliseconds, allowing acquisition of many cycles of the fast dynamics, and less than one cycle of the slow oscillations. Consequently, the values of W(t) are available only at discrete time values, which are denoted by $W(t)=W(i\Delta t)\equiv W_i$. The corresponding discrete form for the filtered weight values are denoted by $w(t)=w(i\Delta t)\equiv w_i$. The discretized form of Eq. (8) then becomes:

$$w_i = W_i - \Sigma_j A_j \sin(i\omega_j+\phi_j)e^{i\beta_j}, \text{ with } \beta_j=\alpha_j\Delta t. \quad \text{Eq. 9)}$$

Equations 7-9 are a generalized finite-Fourier decomposition of the vehicle oscillations for discrete frequencies, $\omega_j=j\pi/2N$, where the symbol, N, denotes the number of data points in the flat-top region. Very short flat-top intervals (N<10) are ignored in this analysis. The average vehicle weight, $\overline{w}$, then is:

$$\overline{w}=(1/N)\Sigma_i w_i. \quad \text{Eq. 10)}$$

The corresponding sample standard deviation, $\sigma$, in the vehicle weight is given by:

$$\sigma=\sqrt{\Sigma_i(w_i-\overline{w})^2/(N-1)}. \quad \text{Eq. 11)}$$

The summations in Eqs. 10-11 are from i=1 to N. The resultant percent error, e, in the vehicle weight is:

$$e=100(\sigma/\overline{w}). \quad \text{Eq. 12)}$$

Equations. 10-12 apply with or without the removal of any oscillation modes in Eq. 9. With these derivations, the specific analysis methodology (via MatLab) can be described. As one of ordinary skill in the art can appreciate, alternative implementations (e.g., FORTRAN, C, C++, .net, Java) can be used to provide equivalent functionality without departing from the spirit and scope of the invention.

Figure 4:
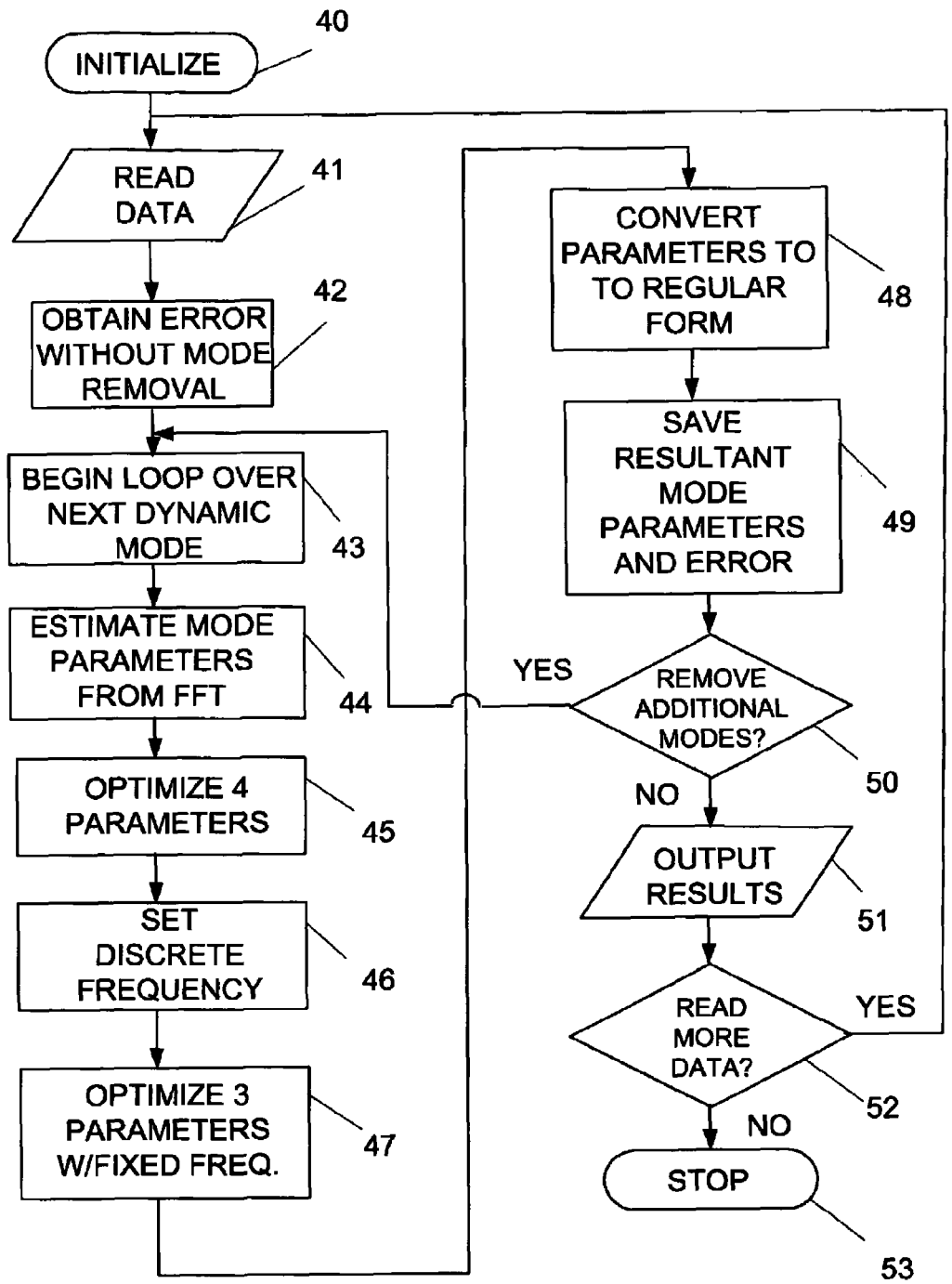
FIG. 4 is a flow chart illustrating a method of the present invention.

FIG. 4 shows an analysis performed by the host computer 10 for reduction of error in the weight data received from the track weighing elements 23. In this programmed routine, the blocks represent one or more program instructions for carrying out the described functions. After initialization, as represented by block 40 in FIG. 4, the analysis code reads the stream of time-serial weight data, and extracts the flat-top region of N data points as represented by I/O block 41 in FIG. 4. This flat top region represents the weight data acquired as a wheel crosses the center one foot of a two-foot wide weighing pad. All subsequent steps are labeled sequentially in FIG. 4, and involve analysis of this same flat-top region of N data points. As represented by process block 42, the computer obtains the unfiltered weight error via Eqs. 10-12 without any mode removal; that is with $w_i=W_i$. Subsequent blocks beginning with the loop initialization represented by block 43, remove each successive oscillatory mode.

Process block 44 represents execution of a standard finite-Fourier transform (fft function in MatLab) of the time serial data to estimate the mode parameters, using the following forms:

$$A_j=\sqrt{B_j^2+C_j^2}, \quad \text{Eq. 13)}$$

$$\phi_j=\arctan(B_j/C_j). \quad \text{Eq. 14)}$$

Here, the symbols, $B_j$ and $C_j$, denote the amplitude of the unshifted cosine and sine terms, respectively:

$$W(t)=B_0/2+\Sigma_j B_j \cos(2j\pi t/N)+C_j \sin(2j\pi t/N), \quad \text{Eq. 15)}$$

$$\omega_j=2j\pi/N. \quad \text{Eq. 16)}$$

The specific value for the mode frequency is the smallest value with:

$$A_j \geq 0.9\max\sqrt{B_j^2+C_j^2}. \quad \text{Eq. 17)}$$

Here, the maximum (max) is taken from all of the FFT amplitudes from Eq. 13, corresponding to the largest mode amplitude from the FFT. If the largest possible amplitude is always used to choose the mode frequency, then very high order frequencies can be chosen, when in fact a low-frequency mode also has a large, but non-maximal amplitude, and thus is more appropriate for removal. The above choice resolves this spurious removal of high-order modes.

Process block 45 uses the mode-parameter estimates from block 44, together with a very rough estimate for the mode growth ($\alpha_j=0.0001$), as the starting point for a 4-parameter search over the set, $\{A_j, \omega_j, \phi_j, \alpha_j\}$, to minimize the error for removal of the j-th (single) mode. The specific MatLab function is fminsearch. If the value of optimal frequency is within 10% of the estimate from block 44, then the parameter values are acceptable, and are used as for the next process in block 46. If the optimal frequency is outside this 10% limit, then the search is repeated with the original estimates of $A_j$ and $\omega_j$, from Eqs. 13 and 16, respectively, but with a random starting point for the phase, $\phi_j=2\pi\rho$, and for the growth rate, $\alpha_j=0.001(2\rho-1)$. Here, the symbol, $\rho$, denotes a uniformly-chosen random number between zero and one, via the MatLab function, rand. If twenty iterations of this random re-initialization do not find an optimal frequency within 10% of the original estimate, then the smallest-error parameter set is used for the next step.

In process block 46, the frequency value from the previous optimization search is converted to the nearest integer multiple of the "fundamental" frequency, $\omega_f=\pi/2N$. The value of $\omega_f$ is half of the value for a standard FFT, because (as explained above), the short-time sampling of the weight data can only acquire less than one cycle of the slow oscillations. Other values of $\omega_f$ were tested, but gave poorer filtering results. If $\omega_j$ is allowed to have any (continuous) value, then two successive modes can have very close values of frequency that beat against each other, yielding non-physical results.

Process block 47 uses the fixed, discrete value of $\omega_j \leq 2\pi$ from execution of process block 46 and the other optimal parameters from step (E) as the starting point for a second search. This search also uses the MatLab function, fminsearch, to minimize the error over the 3-parameter search space, $\{A_j, \phi_j, \alpha_j\}$. Sometimes, the search results have unphysical values (e.g., $A_j<0$, or with an excessive magnitude, or with $\omega_j<0$), which requires conversion of the parameter values to a "regular" form, as represented by process block 48. In some instances, the frequency value can validly have the value, $\omega_j = \pi$; that is, k=N. In this case, the j-th term in Eq. (9) involves the term:

$$A_j \sin(i\omega_j + \phi_j) = A_j \sin(i\pi + \phi_j) = A_j \cos(i\pi)\sin(\phi_j) = A_j(-1)^i \sin(\phi_j).$$  Eq. 18

The analysis converts both $A_j$ and $\phi_j$, as follows:

$$A_j \rightarrow A_j \sin(\phi_j); \phi_j = \text{sign}[(-1)^i].$$  Eq. 19

The replacement of $A_j$ with $A_j \sin(\phi_j)$ avoids a large magnitude that usually occurs for $A_j$ in this case with $\phi_j$ typically close to n. Three further sequential steps complete conversion to a regular form:

$$A_j \leftarrow -A_j, \text{ and } \phi_j \leftarrow \phi_j + \pi, \text{ if } A_j < 0,$$  Eq. 20a $$\phi_j \leftarrow \phi_j + 2\pi, \text{ if } \phi_j < 0,$$  Eq. 20b $$\phi_j \leftarrow \text{mod}_{2\pi}(\phi_j), \text{ if } \phi_j > 2\pi.$$  Eq. 20c Equation 20a assures $A_j > 0$. Eq. 20b assures $\phi_j > 0$. Eq. 20c assures $0 \leq \phi_j \leq 2\pi$, by subtracting integer multiples of $2\pi$ from $b\phi_j$ until the appropriate range is achieved. Eqs. 20a-20c are also imbedded in process block 45. If the resultant error is not lower than that for removal of the previous mode, then the search is repeated (up to 20 times) with the original fixed, discrete value of $\omega_j$ from execution of process block 46 and with random starting points for the amplitude, $A_j = 2\rho A_j(E)$, and for the phase, $\phi_j = 2\pi\rho$, and for the growth/decay rate, $\alpha_j = 0.001(2\rho - 1)$. Here, $A_j(E)$ is the optimal amplitude from execution of process block 45.

The execution of process block 49 saves the parameter values, the resultant error, and the residual weight values, $w_i$, after removal of the j-th oscillatory mode. Decision block 50 is executed to determine whether additional modes should be removed. If the answer is "YES," the routine proceeds to repeat execution of blocks 43-49. If the resultant error is not smaller after removal of the previous mode, the answer is "NO," and the mode removal loop is terminated and the routine proceeds to output the results as represented by I/O block 51. The results can be displayed or printed out in a variety of formats, displays or reports for observation by a human observer. The answer is also "NO," when the number of modes removed, M, reaches floor (N/3). The MatLab function, floor, rounds a positive number down to the next smaller integer. This limit avoids over-fitting of the total number of modes that are filtered, because N is the maximum number of degrees of freedom for mode removal (with the frequency values fixed at discrete values). The degrees of freedom are allocated among the 3 parameters, $\{A_j, \phi_j, \alpha_j\}$, for each of the M modes, implying $3M \leq N$, yielding the above limit. In process block 51, the results of the mode-filtering analysis are saved, including the error for each mode removal step, the resultant parameter values, and the residual weight over time. Then decision block 52 is executed to see if additional weight data is available. If so, as represented by the "YES" result, the routine loops back to execute block I/O block 41. If not, as represented by the "NO" result, then the routine is stopped as represented by termination block 52. This process is robust, namely one that analyzes all of the training and test datasets without user intervention.

We used repetition of the local-search MatLab routine, fminsearch, rather than a global optimizer. First, the use of fminsearch yields excellent results, as discussed below. Second, a simultaneous search over all of the modes is extremely slow, and does not improve the filtered error. Consequently, we omitted a global search in favor of one-at-a-time removal of each oscillatory mode.

Data acquisition hardware (MC12S series 8/16-bit microprocessor) was adapted to acquire time-serial data from the last wheel crossing of the last weigh pad 39 in FIG. 2. The host computer 10 received input data for up to ten independent, time-serial weight measurements for each of several vehicles. These data were the "training" set for development of the methodology of the present invention.

Twenty-eight (28) time-serial datasets were obtained during field tests. Two military vehicles were each weighed six times: a Stryker armored vehicle (total weight<12 tons) and a military wrecker (total weight>12 tons). A civilian station-wagon-class vehicle (Suburban) was also weighed ten times without a load, and again six times with a 200-pound load. All four sets of data were analyzed as part of the methodological "training" set to provide a robust filtering algorithm to reduce the weight measurement error.

Figure 5A:
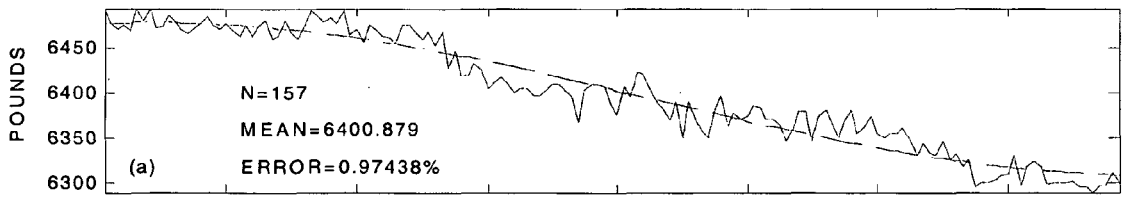
FIGS. 5a-5e are graphs of weight data in samples taken over time using the system of FIGS. 1-3, and removing oscillatory modes using the method of FIG. 4.
Figure 5B:
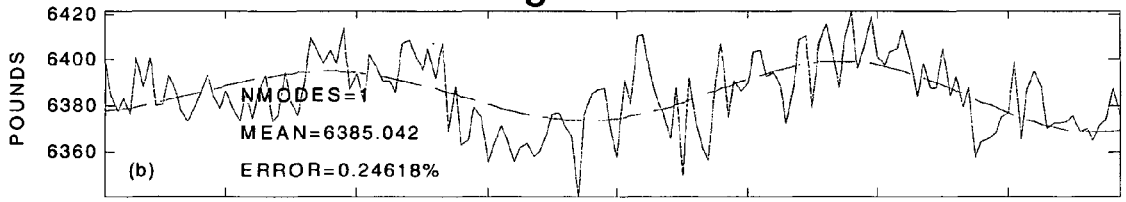
Figure 5C:
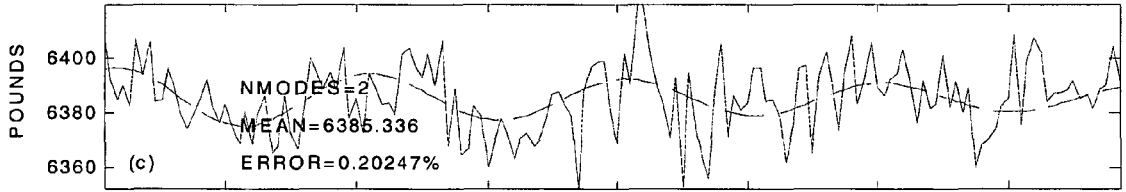
Figure 5D:
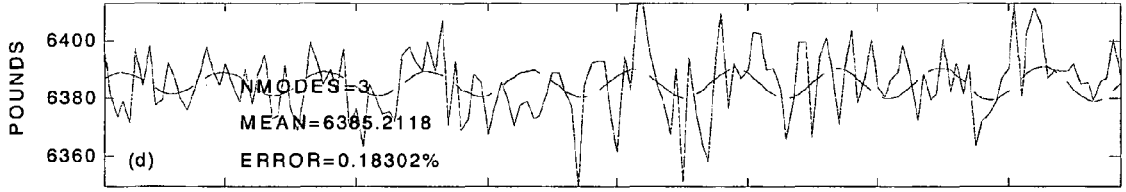
Figure 5E:
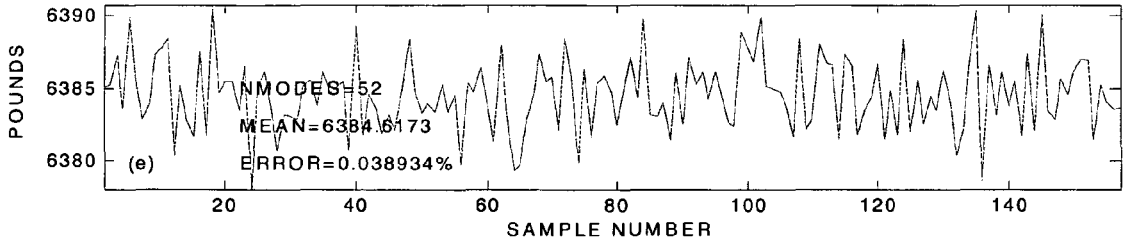

FIGS. 5a-5e shows a typical result of this analysis. FIG. 5a displays the unfiltered weight data vs. time (solid line) for a military wrecker vehicle. The left side of FIG. 5a shows the unfiltered error (ERROR=0.97438%), the mean weight (MEAN=6400.879), and the number of points in the flat-top segment (N=157). The raw data in this example fall erratically from a maximum to a similarly erratic minimum. The underlying trend is roughly one-half of a sine wave, which is removed via the empirical-fitting methodology. The resultant best-fit curve for this first mode is shown by the dashed curve in FIG. 5a, and is typical of the time-serial dynamics for heavy vehicles. FIG. 5b illustrates the residual variability (solid line) after removal of the partial sine-wave of FIG. 5a; the corresponding mean and percent error of the residue are at the right of the subplot, as before. The residual time-serial weight data have an erratic 2-period sine wave with a corresponding best-fit (dashed-line) curve, the removal of which leaves the residue in FIG. 5c with a further error reduction. FIGS. 5c-5d display the residue and percent error after removal of two more oscillatory modes. FIG. 5e shows the residual error versus time after removal of 52 modes. The residual error for removal of 52 modes is 0.039%, which is well below the 0.1% limit.

Figure 6A:
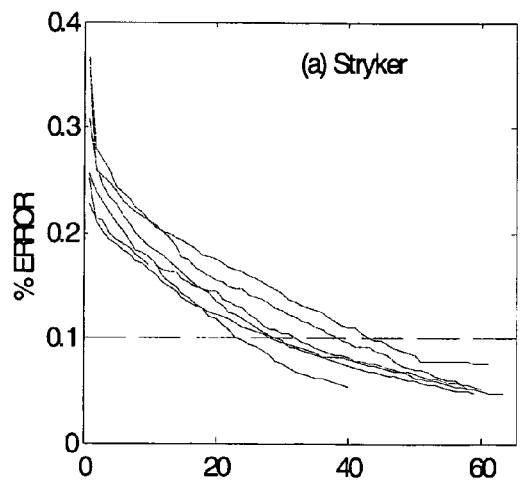
FIGS. 6a-6d are graphs of the percentage error in weight vs. the number of oscillatory modes removed from the weight data.
Figure 6B:
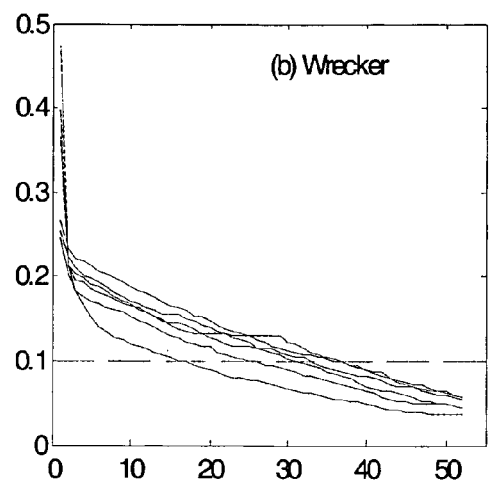
Figure 6C:
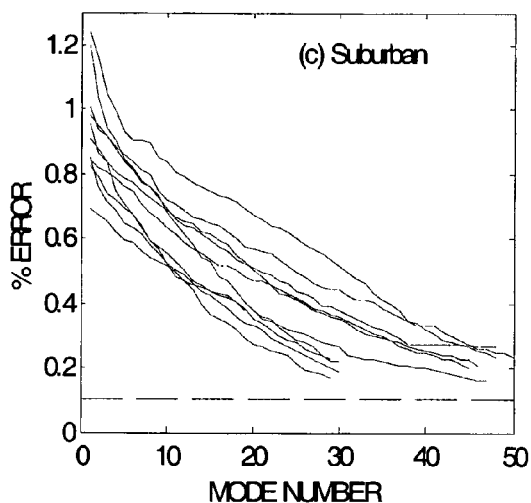
Figure 6D:
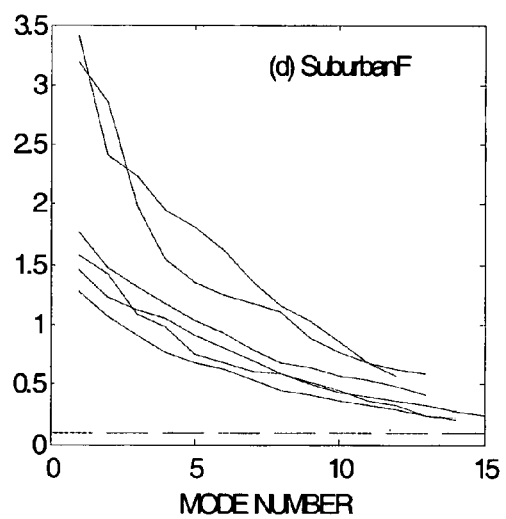

FIGS. 6a-6d shows the percent error, e(k), versus the number of filtered modes, $k \leq M$, for four different vehicles. FIG. 6a shows e(k) versus k for each of a Stryker-series of measurements, reaching e(k)<0.1% for $24 \leq k \leq 44$. FIG. 6b shows e(k) versus k for each of a Wrecker-series of measurements, reaching e(k)<0.1% for $17 \leq k \leq 37$. FIG. 6c shows e(k) versus k for each of a Suburban-series of measurements, for which smallest error is 0.161% after removal of 47 modes. FIG. 6d shows e(k) versus k for each of a Suburban F-series of measurements, for which smallest error is 0.21 after removal of 13 modes. These plots clearly show the consistency in mode-removal for low-error results from slow vehicles, and the greater spread (inconsistency) in mode-removal from higher-speed vehicles.

Figure 7:
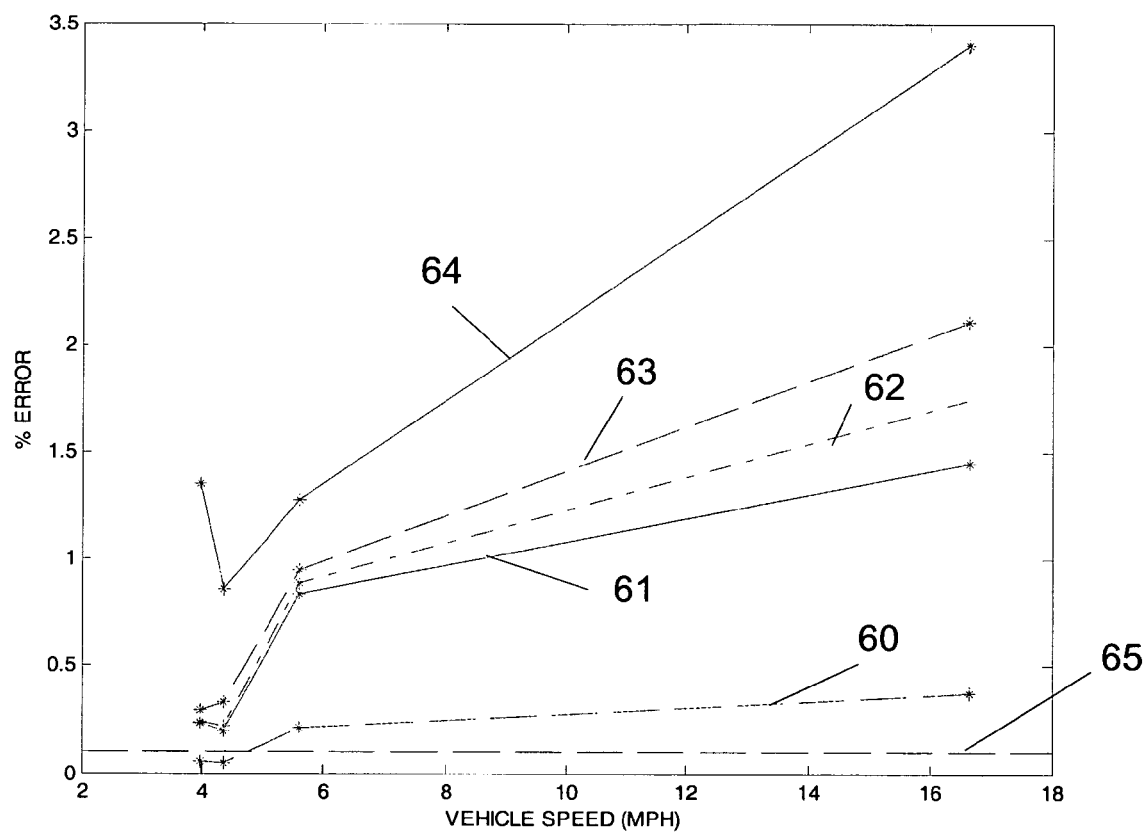
FIG. 7 is a graph of percentage error in weight vs. speed of a vehicle over the track system of FIG. 2.

FIG. 7 summarizes the results from FIGS. 6a-6e into a single plot of error versus vehicle speed. The left-most column of points (*) corresponds to the average of the Stryker-series of measurements at an average speed of 4 MPH. The second column of points from the left is the Wrecker-series of measurements at an average speed of 4.3 MPH. The second column of points from the right is the Suburban-series of measurements at 5.6 MPH. The right-most column of points shows the Suburban F-series of measurements at an average speed of 16.6 MPH. The top curve 64 is the unfiltered error for each of the vehicles with errors ranging from 0.857% (Wrecker) to 3.397% (Suburban F) The second curve from the top 63 shows the filtered error after removal of one mode with errors ranging from 0.294% (Stryker) to 2.113% (Suburban F). The third curve from the top 62 shows the filtered error after removal of two modes with errors ranging from 0.216% (Wrecker) to 1.747% (Suburban F). The second curve from the bottom 61 displays the filtered error after removal of three modes with errors ranging from 0.199% (Wrecker) to 1.448% (Suburban F). The bottom curve 60 illustrates the filtered error after removal of all M modes with error ranging from 0.048% (Wrecker) to 0.374% (Suburban F). The floor in the filtered error at ~4 MPH suggests that this speed (but probably not less) will minimize the error in weight measurements. The horizontal black dashed curve 65 indicates the 0.1% error level for certifiable weight measurements. FIG. 7 also shows that removal of many oscillatory modes significantly reduces the error at all speeds.

A second set of time-serial weight measurements was acquired for a realistic (test) demonstration of the mode-filtering, error reduction approach described herein. Ten (or more) independent measurements were taken from each of several vehicles. This effort involved the following additions to the two weight-sensing pads: (a) addition of a 16-channel National Instruments™ data acquisition system; (b) programming to acquire the 8-channel data from each weigh pad for each wheel crossing; (c) programming to convert the independent data channels into total-pad weight for each wheel crossing at each sampling time; (d) programming to extract the flat-top region (center of the pad data); (e) providing the time-serial, total-pad weight data from both sides of the vehicle for (f) analysis by the mode-method illustrated in FIG. 4. The test protocol was as follows.

1) Weigh the vehicle on a certified IGS;
2) Weigh the vehicle with the system described above,
3) Repeat step 2 many times for each vehicle;
4) Weigh the vehicle on a certified IGS;
5) Repeat steps 1-4 for each of several vehicles.

Steps 1 and 4 provide two identical and independent weight measurements from the IGS for each vehicle. Steps 2 and 3 provide several identical and independent weigh-in-motion measurements for the same vehicle. This protocol allows a statistical comparison of the mode-filtered weights (with a corresponding standard deviation) to the IGS measurement, which is certified to a standard deviation of <0.1% for total weight only. This protocol also allows calibration of the mode-filtered weight to the certified IGS measurements. On the basis of the previous results, all vehicles were driven slowly across the weigh pad, resulting in many more data points for each wheel crossing of a pad.

Test data were obtained for four vehicles that were weighed: Ford F-250, Freightliner truck, General Motors H3 Hummer, and Chevrolet Silverado. Weight data were obtained from two pads that simultaneously measured the left- and right-side tires as the vehicle was driven over the weigh-in-motion system. Three datasets (all from the Hummer) had time-serial weight data for only one axle (two wheel crossings); the rest (125 datasets) included data from two axles (four wheel crossings for the F-250 and Silverado) or three axles (six wheel crossings for the Freightliner truck). Each vehicle was weighed in three different ways: (1) driving the vehicle normally across the weigh pads; (2) adding a ½" bump before crossing the weigh pads; and (3) adding a 1" bump before the weigh pads. The weight for a single weigh-pad crossing varied from 900 pounds for the Silverado to 5,500 pounds for the Freightliner truck. A data quality check revealed that most of the datasets have one (or more) weight value(s) at the end of each weigh-pad crossing that are inconsistent with the other data (e.g., dramatically higher or lower than the other values). These transient points were removed before application of the mode filtering method of the present invention.

Figure 8:
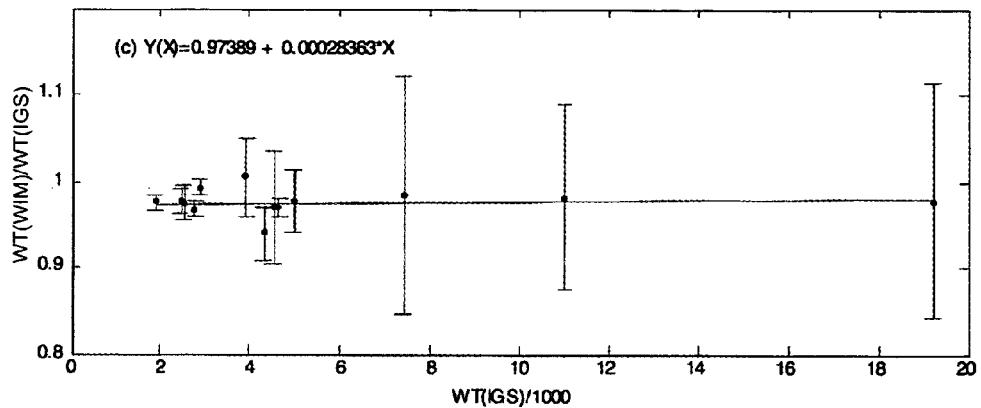
FIG. 8 is a graph of the normalized error of weighing a vehicle with the present system in comparison with weighing the vehicle on in-ground static scales (IGS)

The present system weight result is normalized by the corresponding IGS weight in each case, namely Y=(WIM weight)/(IGS weight), with error bars of one standard deviation. A least-square, straight line provides an excellent fit to these data in all cases with the fitting parameters shown in each subplot. FIG. 8 shows that the present system weight measurements are systematically low by 2.6%, and rise slightly (0.03% per 1,000 pounds) with increasing weight. Only the total IGS weight is certified to an error of <0.1%, which is consistent with the present system weight results. These results show that mode-filtering achieves a measurement error (precision) of <0.1% in 90% of the best cases for this test sequence.

A third set of time-serial measurements were acquired using the same test protocol as the previous "test" set with in-ground scale (IGS) measurements after every 3 to 7 drive-through crossings (eight IGS measurements). This experiment used two 16-channel National Instruments™ data acquisition systems to acquire time-serial weights simultaneously from both the front and back axles of three vehicles (Ford F-250, Hummer H3, and Caravan) at a sampling rate of 4 kHz. The results for the Ford F-250 are shown in Table 1 and FIG. 9.

Use of the available 16-channel data acquisition system per axle did not allow sufficiently accurate synchronization between the weight data for both axles to obtain total weight data directly. Consequently, the time lag between the front and rear weight data was varied (i.e., sampled) to find the minimum sample standard deviation in the total weight and effectively synchronize the weight data for the two axles to allow computation of total weight data. This sampling procedure will not be needed when the data acquisition systems automatically synchronize weighing data from all weigh pad pairs, which is anticipated.

The experimental test protocol involved: 1) weigh the vehicle on a certified IGS scale; 2) weigh the vehicle dynamically via the system and method described above for the present invention; 3) repeat step 2 three to seven times for each vehicle; 4) weigh the vehicle on a certified IGS scale; and 5) repeat steps 1-4 for each of several vehicles. Steps 1 and 4 provide two identical and independent weight measurements from the IGS scale for each vehicle. Steps 2 and 3 provide several identical and independent weigh-in-motion measurements for the same vehicle. This protocol allows a statistical comparison of the mode-filtered (electronically modified using two digital acquisition systems) present system weights (with a corresponding standard deviation) to the IGS scale measurement, which is certified to a standard deviation of <0.1% for total weight only. This protocol allows calibration of the mode-filtered weight to, for example, certified IGS scale measurements in the future according to the International Recommendation OIML R 134-1 Edition 2003 (E).

Figure 9:
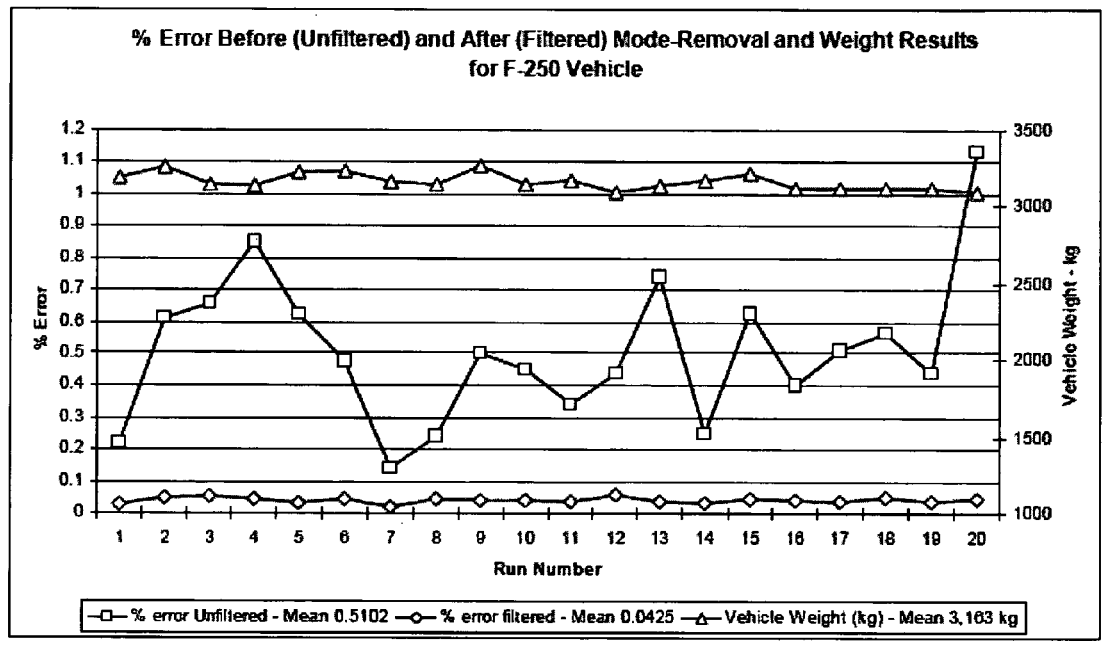
FIG. 9 is a graph of percentage error in weight vs. a number of weighing runs of a single vehicle, showing raw weighing data as well as weighing data that is processed according to the present invention.

Table 1 in Appendix A and FIG. 9 summarize the results for the F-250 vehicle after application of the mode-filtering method of the present invention to these total-weight data, including the unfiltered percent error, the filtered percent error, and total weight. These results are a substantial improvement over the previous results, namely: (1) all error values (filtered percent error), are well below 0.1% after mode removal, (2) all filtered-weights occur within two standard deviations of the average (no outliers), and (3) total weight is consistent with the certification requirement, in contrast to single-wheel or single-axle weights as analyzed above. Consequently, the use of mode-filtering on the total weight data provides both lower error (more precision), as well as more accuracy (no outliers). Therefore, using the system of the present invention and by adjusting the weigh pads spacing to accommodate all of the vehicle weight (i.e., weigh all axles simultaneously), our <0.1% error goal was obtained. The use of total vehicle weight is consistent with the above-cited IGS-certification standard. Moreover, the use of total vehicle weight implicitly removes dynamic variations in weight that arise (for example) from front-to-back rocking, side-to-side rocking, and whole-vehicle bouncing.

It will be apparent to those of ordinary skill in the art that other modifications might be made to these details to arrive at other embodiments. For example, various weigh-pad measurement devices (e.g., piezo-electric, strain-gage, quartz, load-cell and bending-plate) can be used. The method of the invention could also be used with strip sensors, provided that an appropriate data acquisition system is developed that dynamically samples at a sufficiently high rate, with sufficient bit precision and a sufficiently accurate sensor calibration procedure. It should be understood that the description of a preferred embodiment herein was by way of example, and not by way of limitation, and for the scope of the invention herein reference should be made to the claims that follow.

APPENDIX A

TABLE 1

F-250 Vehicle Weight and Error Data

| Set # | % error e(unfltrd) | % error e(fltrd) | $\bar{w}$ kg |
|---|---|---|---|
| 01 | 0.2199 | 0.0297 | 3190 |
| 04 | 0.6109 | 0.0492 | 3254 |
| 05 | 0.6580 | 0.0537 | 3145 |
| 06 | 0.8496 | 0.0458 | 3137 |
| 07 | 0.6226 | 0.0354 | 3224 |
| 08 | 0.4773 | 0.0453 | 3228 |
| 11 | 0.1439 | 0.0214 | 3163 |
| 15 | 0.2426 | 0.0479 | 3146 |
| 17 | 0.5013 | 0.0411 | 3264 |
| 18 | 0.4503 | 0.0438 | 3142 |
| 19 | 0.3411 | 0.0382 | 3169 |
| 20 | 0.4404 | 0.0573 | 3094 |
| 21 | 0.7406 | 0.0371 | 3134 |
| 23 | 0.2528 | 0.0346 | 3171 |
| 28 | 0.6265 | 0.0445 | 3209 |
| 31 | 0.4022 | 0.0427 | 3121 |
| 32 | 0.5088 | 0.0376 | 3114 |
| 33 | 0.5655 | 0.0517 | 3121 |
| 34 | 0.4377 | 0.0374 | 3120 |
| 35 | 1.1327 | 0.0447 | 3089 |
| Mean | 0.5102 | 0.0425 | 3163 |
| $\sigma/\bar{w}$ | | | 0.017 |

The invention claimed is:

1. A method of weighing a vehicle on a plurality of weight-sensing elements and determining vehicle weight to a tolerance of no greater than 0.1% error as measured on a certified scale, the method comprising:
   receiving at a computer at least one set of weighing data for a vehicle that has passed over respective weight-sensing elements;
   processing the weighing data within the computer to provide a plurality of mode parameters representing oscillatory modes in the weighing data;
   analyzing the plurality of mode parameters for the weighing data within the computer to minimize the error in the weighing data; and
   processing the weighing data within the computer to remove data representing the oscillatory modes to reduce the error in the weighing data until the error is 0.1% or less of the vehicle weight; and
   providing an output from the computer of a resultant error for observation by a human observer.

2. The method of claim 1, wherein the analyzing of the mode parameter includes determining a minimum-error oscillatory mode corresponding to a frequency at which there is a minimum of error in the weighing data; and
   wherein the processing of weighing data to remove oscillatory modes includes removing weighing data for higher frequency modes and lower frequency modes related to the minimum-error mode.

3. The method of claim 1, after determining the minimum error frequency, further comprising processing the weighing data to remove outlier items of data that are more than two standard deviations from an average weight value from the data being processed.

4. The method of claim 1, further comprising synchronizing the weighing data from front wheels of the vehicle to the weighing data for rear wheels of the vehicle so as produce a set of weighing data for a weight of an entire vehicle.

5. The method of claim 1, wherein the weighing data is for a total weight of the vehicle and has been derived from weighing data for a front two wheels of the vehicle, a next two wheels of all successive axles and a rear two wheels of the vehicle.

6. The method of claim 1, wherein the vehicle is traveling at a speed of not more than 5 miles per hour over the weight sensing elements.

7. The method of claim 1, wherein the processing of the weighing data to obtain a plurality of mode parameters further comprises applying a finite Fourier transform calculation to the weighing data.

8. The method of claim 1, wherein each weight sensing element utilizes a plurality of load cells to sense the weight of one wheel portion of a vehicle passing over the weight sensing element.

9. The method of claim 1, wherein the output of a resultant error is in the a form of a display on a computer screen.

10. The method of claim 1, wherein the weight sensing elements are part of a vehicle inspection station for also determining a volume of the vehicle.

11. A system determining vehicle weight to a tolerance of no greater than 0.1% error as measured on a certified scale, the system comprising:
   a computer input device for reading in weighing data for a vehicle, as the vehicle passes over a plurality of weight-sensing elements;
   means for processing the weighing data from individual weight sensing elements into a dataset representing a total weight of a vehicle;
   a first computer program portion executable by a computer for processing the dataset of weighing data to provide a plurality of mode parameters representing oscillatory modes in the data due to dynamic movement of the vehicle during weighing;
   a second computer program portion executable by the computer for analyzing a plurality of mode parameters for weighing data to minimize the error in the weighing data; and
   a third computer program portion executable by the computer for processing the weighing data to remove data for oscillatory modes related to movement of the vehicle during weighing and calculating the error in the data set of weighing data until the error is 0.1% or less of the vehicle weight; and a fourth computer program portion executable by the computer for providing an output of a resultant error for observation by a human observer.

12. The system of claim 11, wherein the error is minimized by determining a minimum error oscillatory mode corresponding to a frequency at which there is a minimum of error in the weighing data; and wherein the processing of weighing data to remove oscillatory modes includes removing higher frequency and lower frequency modes related to the minimum-error mode.

13. The system of claim 12, further comprising a computer program portion for processing the weighing data to remove outlier items of data that are more than two standard deviations from an average weight value from the dataset being processed.

14. The system of claim 11, wherein the means for processing data from individual weight sensing elements into data representing the total weight of a vehicle program includes means for synchronizing the weighing data from front wheels of the vehicle to the weighing data for the rear wheels of the vehicle so as represent a sample weight of an entire vehicle.

15. The system of claim 11, wherein the dataset of weighing data is for a total weight of the vehicle and has been derived from weighing data for a front two wheels and a rear two wheels of the vehicle.

16. The system of claim 11, wherein the vehicle is traveling at a speed of not more than 5 miles per hour over the weight sensing elements.

17. The system of claim 11, wherein the processing of the weight data to obtain a plurality of mode parameters further comprises applying a finite Fourier transform calculation to the weighing data.

18. The system of claim 11, wherein the output of a resultant error is in the a form of a display on a computer screen.

19. The system of claim 11, further comprising a plurality of weight sensing elements for generating weighing data.

20. The system of claim 19, wherein the weight sensing elements each include a plurality of load-sensing devices within each weight sensing element.

21. The system of claim 19, wherein each weight sensing element utilizes a plurality of load cells to sense the weight of one wheel portion of a vehicle passing over the weight sensing element.

22. The system of claim 19, wherein the weight sensing elements are part of a weighing platform for weighing a vehicle.

23. The system of claim 11, wherein the system is part of a vehicle inspection station for determining a volume of the vehicle.

24. A method of weighing a vehicle on a plurality of weight-sensing elements and determining vehicle weight to a tolerance of no greater than 0.1% error as measured on a certified scale, the method comprising:

receiving at a computer at least one set of weighing data for a vehicle that has passed over respective weight-sensing elements;

processing the weighing data within the computer to provide a plurality of mode parameters representing oscillatory modes in the weighing data;

determining oscillatory modes in the weighing data each corresponding to a respective frequency of oscillation in the weighing data;

and after determining each oscillatory mode, removing the weighing data corresponding to the respective frequency of oscillation;

and thereafter, computing the error in the weighing data against a minimum error requirement of 0.1% or less;

and if not within the minimum error requirement, determining another subsequent oscillatory mode corresponding to another frequency of oscillation in the weighing data, removing the weighing data corresponding to other frequency and again computing the error in the weighing data against the minimum error requirement;

and upon reaching the minimum error requirement, providing an output from the computer of a resultant error for observation by a human observer.

* * * * *